United States Patent [19]
Lee et al.

[11] Patent Number: 5,461,875
[45] Date of Patent: Oct. 31, 1995

[54] AUTOMATIC OUTLET OPENING/CLOSING APPARATUS OF AIR-CONDITIONER AND CONTROL METHOD THEREOF

[75] Inventors: Kab Y. Lee, Suwon; Hee-Sang Yoo, Ansung; Young C. Jang, Seoul, all of Rep. of Korea

[73] Assignee: Samsung Electronics Co., Ltd., Suwon, Rep. of Korea

[21] Appl. No.: 262,987

[22] Filed: Jun. 21, 1994

[30] Foreign Application Priority Data

| Jun. 24, 1993 | [KR] | Rep. of Korea | 93-11612 U |
| Aug. 28, 1993 | [KR] | Rep. of Korea | 93-16941 |
| Nov. 5, 1993 | [KR] | Rep. of Korea | 93-23124 |
| Dec. 16, 1993 | [KR] | Rep. of Korea | 93-28090 U |

[51] Int. Cl.⁶ ............... F25B 49/00; F25D 17/00
[52] U.S. Cl. ............... 62/89; 62/131; 62/180; 454/236; 454/324
[58] Field of Search ............... 62/131, 89, 180, 62/262, 186, 265; 454/256, 275, 324–334, 239

[56] References Cited

U.S. PATENT DOCUMENTS

| 4,307,579 | 12/1981 | Bolton | 62/262 |
| 4,802,342 | 2/1989 | Gustafson et al. | 62/262 X |
| 5,341,650 | 8/1994 | Nagasawa et al. | 62/180 |

FOREIGN PATENT DOCUMENTS

| 28648 | 1/1990 | Japan . | |
| 2309148 | 12/1990 | Japan . | |
| 5301521 | 11/1993 | Japan | 62/131 |

Primary Examiner—William E. Wayner
Attorney, Agent, or Firm—Burns, Doane, Swecker & Mathis

[57] ABSTRACT

An automatic mechanism for opening the outlet of an air conditioner enables the outlet to be open to an extent creating a selected velocity of discharge air. The movement of the door is monitored and is terminated when the door reaches a position for establishing the selected velocity or when the door fails to reach that position within a predetermined position. A support member is provided on which are mounted a door-moving motor and air-directing vanes. The support member includes guides for guiding vertical movement of the door.

6 Claims, 14 Drawing Sheets

AUTOMATIC OUTLET OPENING/CLOSING APPARATUS OF AIR-CONDITIONER AND CONTROL METHOD THEREOF

The invention is related to providing an air-conditioner and, in particular, to providing an automatic outlet opening/closing system for automatically controlling the opening/closing state of the outlet during the air-conditioning of a room, thereby increasing the efficiency of the room air-conditioning, and for completely closing the outlet during the waiting (non-operating) mode, thereby improving the exterior appearance of the air-conditioner and preventing the introduction of fouling substances such as dusts, dust, dirt into the air-conditioner.

An air-conditioner is generally provided with an inlet and an outlet to suction air therein and then discharge the air-conditioned air. In addition, the outlet includes a blade structure for adjusting the wind directions, in a manual or (vane) motor operated manner, in order to enhance the efficiency of the air-conditioner. But, such a configuration is undesirable in a design view considering the external appearance.

On the other hand, appliances is given a larger weight on the personnel life and electronic appliances are becoming more and more prevalent, and air-conditioners are indispensable in making the room atmosphere comfortable. Thus, electronic appliances are entering the design era of the furniture concept. Therefore, the air-conditioner is designed not only to perform the air-conditioning function a, room, but also its body is being made of a special material making the exterior appearance fine to harmonize with room furniture.

Nevertheless, the air-conditioner design retains an inlet and an outlet to be shaped in a conventional manner. Which detracts from total exterior appearance.

Also, the air-conditioner causes dust or other alien materials to be introduced therein with the outlet being left opened during the waiting mode. That can be the cause of break-downs. The outlet is recognized only as the function to discharge air-conditioned air. For example, the flow rate of wind (air flow) passing through the outlet is dependent on the capacity of a blow fan, and the wind direction for discharging air is dependent upon a blade structure.

On the other hand, the typical technology for opening/closing the outlet, if necessary, to keep the inner portion of a body clean in a conventional air-conditioner is described in U.S. Pat. No. 4,307,579. The patent includes a discharge door assembly for use with a room air conditioner. The discharge door is pivotally mounted and has a tap extending therefrom into a slot formed in a frame portion of the front panel of the air-conditioning unit. The tap and slot coact to limit inward deflection of the discharge door. It prevents the introduction of dust into an indoor unit.

Japan Laid-Open Patent Publication No. 90-8648 relates to the configuration of an air-conditioner which enables an area of an air blow port or an air blowing direction to be easily varied by a method, wherein an air blowing portion is divided into a plurality of segments bellows type or winding type adjusting plates capable of varying each of the divided opening areas and blowing directions, individually, even after the installation of the main body case, are arranged in such a way that they may be moved in or out.

Also, Japan Laid-Open Patent Publication No. 90-309148 concerns the technology of an air-conditioner which enables a required amount of air to be fed to each room under a stable condition by a method, wherein an opened or closed state of an air adjusting damper in each of the rooms is detected to determine a required amount of fed air. The determined required amount of fed air is compared with the detected amount of blown air and then the speed of an air blower is varied.

These conventional air-conditioners have outlets not designed under the furniture concept, but also gives to the doors of their outlet only the meanings of the starting or stopping for blowing conditioned air, even though the adjustment of the air amount to be discharged is performed by an opening/closing apparatus, manually or automatically.

Accordingly, the main object of the invention is to provide an automatic outlet opening/closing system of an air-conditioner that enables the inner portion of the air-conditioner to be kept clean, its overall appearance to be like furniture, and the wind velocity being freely adjusted to effectively perform the air-conditioning of a room.

The other object of the invention is to provide an automatic outlet opening/closing apparatus of an air-conditioner for closing an outlet during the waiting mode and for opening the outlet during the operating mode.

Another object of the invention is to provide an automatic outlet opening/closing apparatus of an air-conditioner for completely closing an outlet during the waiting mode and for closing the outlet in part during the operating mode to adjust the wind velocity of discharged conditioned air.

Still another object of the invention is to provide a control method of an automatic outlet opening/closing apparatus for completely closing an outlet during the waiting mode and for closing the outlet in part during the operating mode to adjust the wind velocity of discharged conditioned air.

SUMMARY OF THE INVENTION

According to the invention, an air-conditioner can adjust the opening/closing state of a door to an outlet to increase the efficiency of room air-conditioning during the operating mode and closes the outlet during the waiting mode to prevent the introduction of dust or alien materials into the body thereof.

The invention comprises an operation selecting portion for inputting the operating signal of an air-conditioner, a door opening/closing sensing portion for sensing the opening/closing state of an outlet, a control portion for receiving a operating signal from the operation selecting portion and a signal sensed by the door opening/closing sensing portion and controlling a system according to its own programming, a door motor driving portion for receiving a signal from the control portion and driving a door motor, a fan motor driving portion for receiving a signal from the control portion and driving a fan motor to blow conditioned air into room and a compressor driving portion for receiving a signal from the control portion and driving a compressor, wherein the door motor driving portion further includes a supporting means mounted on the upper portion of a body cover a motor fixed on the supporting means and for driving according to a signal from the control portion, a power transferring portion for transferring the power of the motor to a door and the door for being guided in the supporting means to reciprocate and opening/closing the outlet, the door opening/closing-sensing portion includes a plurality of sensors which are photo-couplers or hole elements, and the operation selecting portion includes a wind velocity varying key to adjust the wind velocity.

Also, the invention provides a method for controlling the operation of a door to open and close an outlet based on an automatic outlet opening/closing apparatus. The method comprises steps of initializing the system of an air-conditioner and performing its own system programming and proceeding to a door operation routine to judge whether a door operation bit is set at "1"; performing an initial operation mode of setting a door opening bit to get a door to open an outlet, turning a display on and interrupting the power source of all loads while turning on a door opening relay; performing a door fist stage operation mode based on a signal from a door opening/closing sensing sensor; performing a door second stage operation mode for conducting the further operation of the door based on a signal from a door operation selecting key; performing a wind velocity varying operation mode for adjusting the wind velocity based on a signal from a wind velocity varying key; performing a door operation detecting mode for detecting the change of the door operation during the operation; and performing the interrupting mode of the door operation if the door operation is undesirable.

BRIEF DESCRIPTION OF THE DRAWINGS

The invention will now be described in detail with reference to the accompanying drawings, in which.

DETAILED DESCRIPTION OF THE INVENTION

Figure 1A:
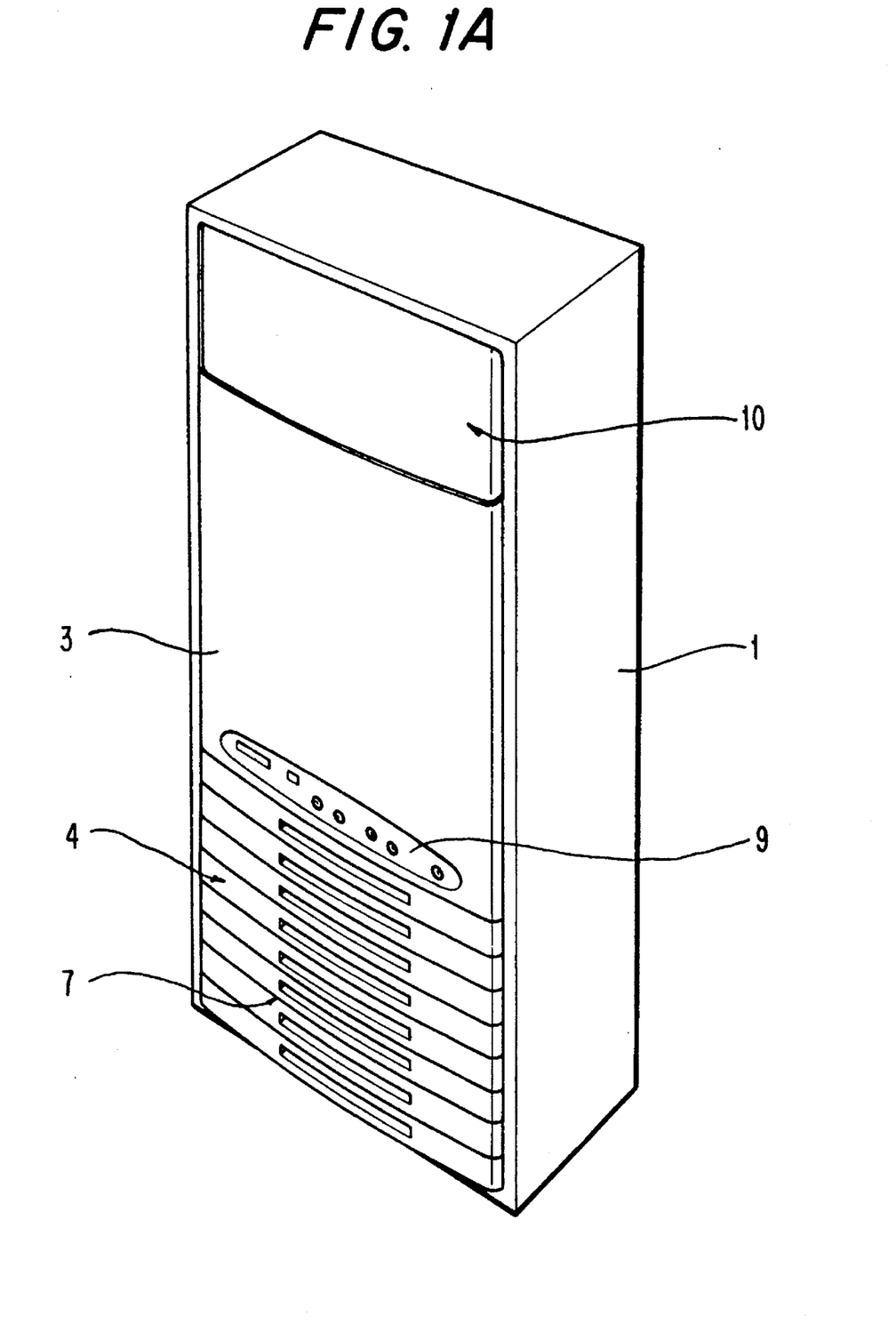
FIGS. 1A and 1B are perspective views illustrating a package type air-conditioner whose door opens and (FIG. 1B) and closes (FIG. 1A) an outlet.
Figure 1B:
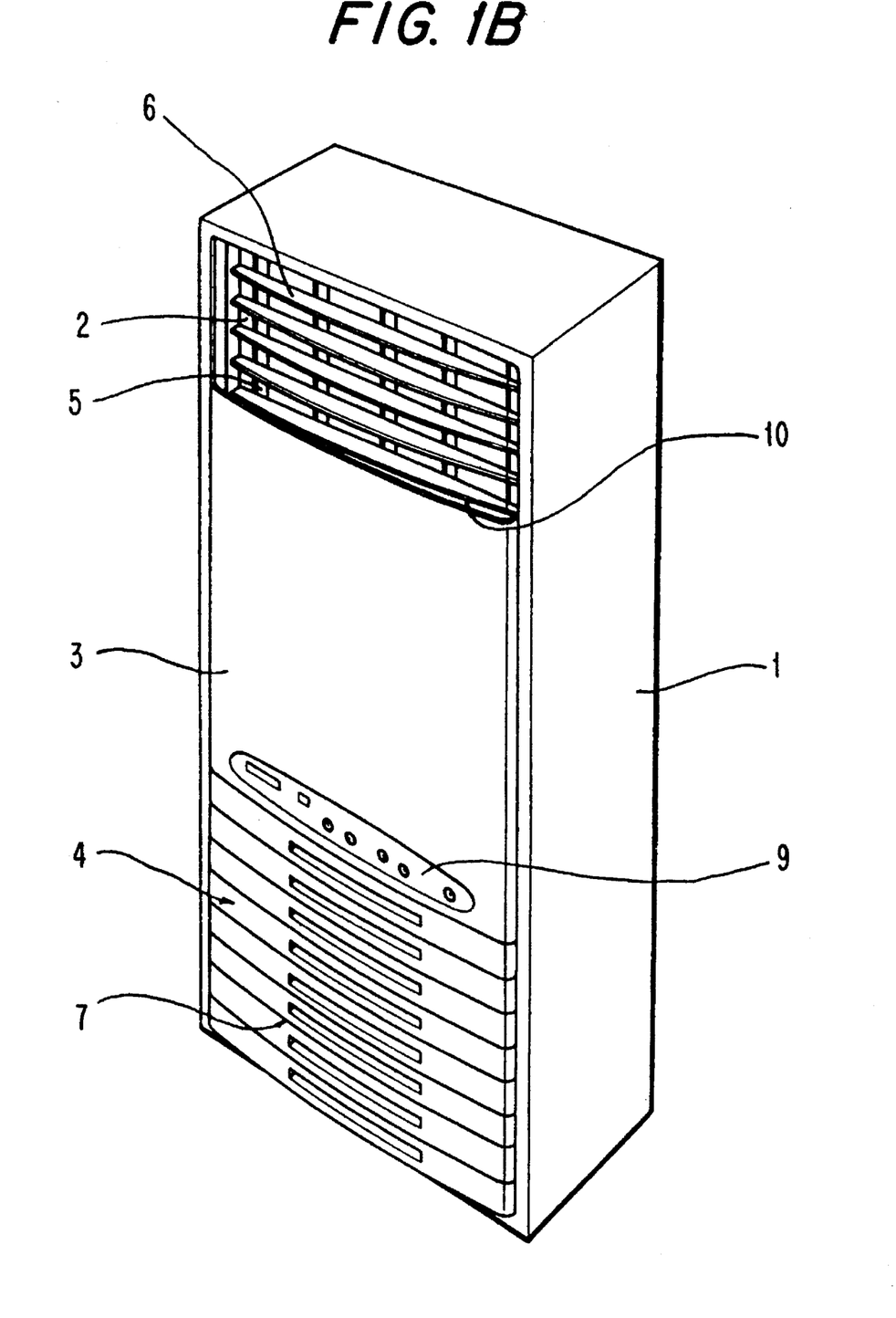

FIG. 1 shows a package type air-conditioner exhibiting the invention, wherein FIG. 1A illustrates the state of a door 10 closing an outlet, and FIG. 1B shows the state of the door 10 opening the outlet. As it is seen through these drawings, the exterior appearance of the air-conditioner represented in FIG. 1A is more aesthetic than that of the air-conditioner shown at FIG. 1B. Herein, it is noted that such a configuration may be introduced into the furniture concept.

The air-conditioner includes a body 1 made of a special material in light to the furniture concept. The body 1 includes a cover member 3 on the front surface of which a control portion 9 is pivotally fixed. The control portion 9 is constructed as a control box shape in which a printed circuit board including control circuit elements is mounted. The cover member 3 includes an outlet 2 formed at the upper portion to be opened and closed by means of the door 10 and an inlet 4 at the lower portion on which a grill is mounted. A wind direction adjusting structure is mounted adjacent to the outlet 2, which includes left and right wind direction adjusting blades 5 for swing blown air and up and down wind direction adjusting blades 6.

Figure 2:
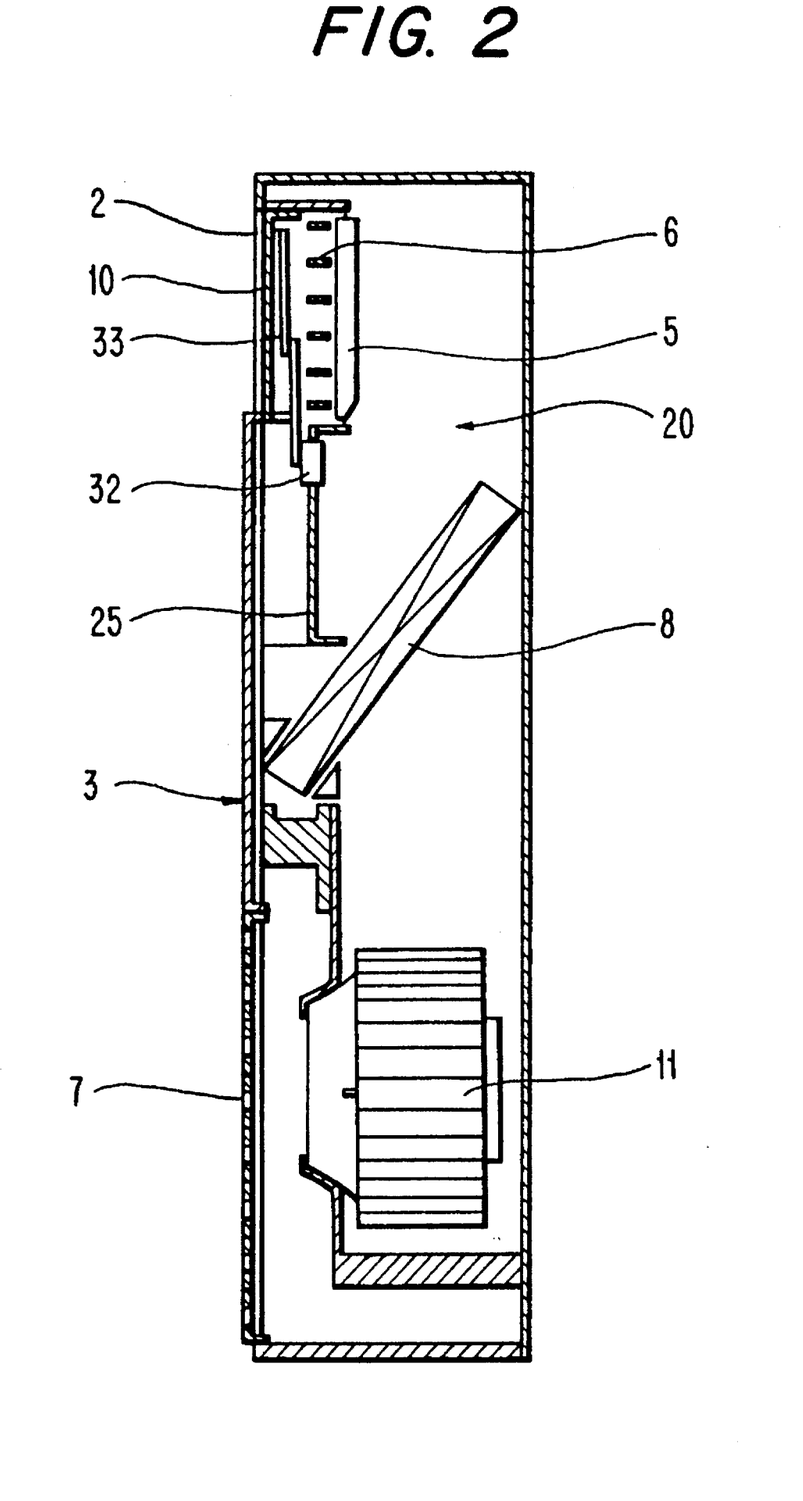
FIG. 2 is a vertical crosssectional view schematically illustrating the inner portion of the package type air-conditioner whose door is constructed according to the principle of the invention.

Also, an evaporator 8 is mounted slantwise at the approximately middle portion in the body 1, and a compressor 11 is fixed on the lower portion adjacent to the front inlet 4 as shown in FIG. 2, the detailed description and mounting method of which will be omitted since it is beyond the claim scope of the invention. A door opening/closing apparatus 20 is mounted behind the cover member 3, wherein a motor 32 and a power transferring member 33 each is properly attached to the door 10 and a supporting plate 25 to move the door 10 upward and downward. The left and right wind direction adjusting blades 5 and the up and down wind direction adjusting blades 6 are properly mounted on the supporting member 24 (not shown).

Figure 3:
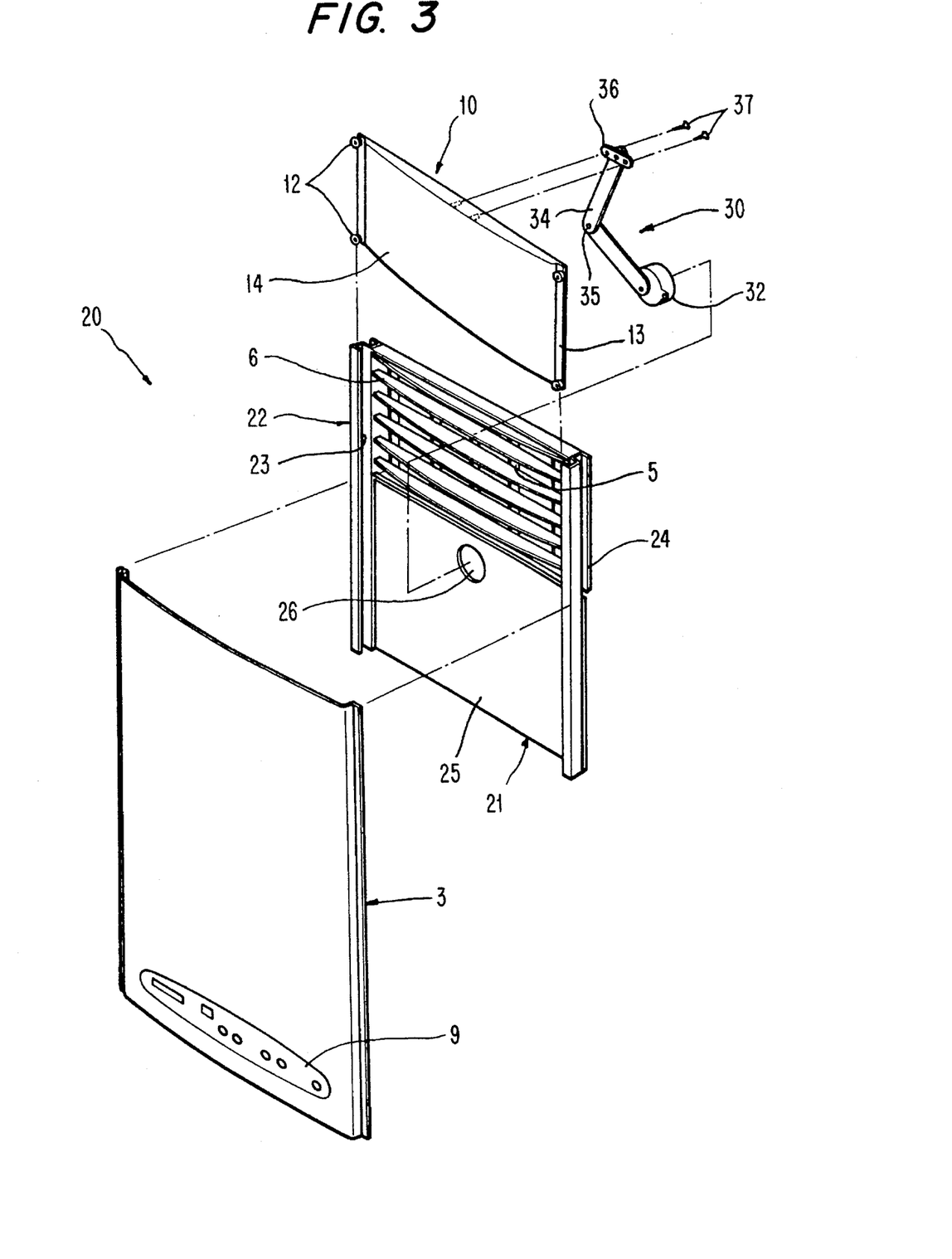
FIG. 3 is an exploded perspective view illustrating a door opening/closing apparatus assembled to a cover according to the principle of the invention.
Figure 4A:
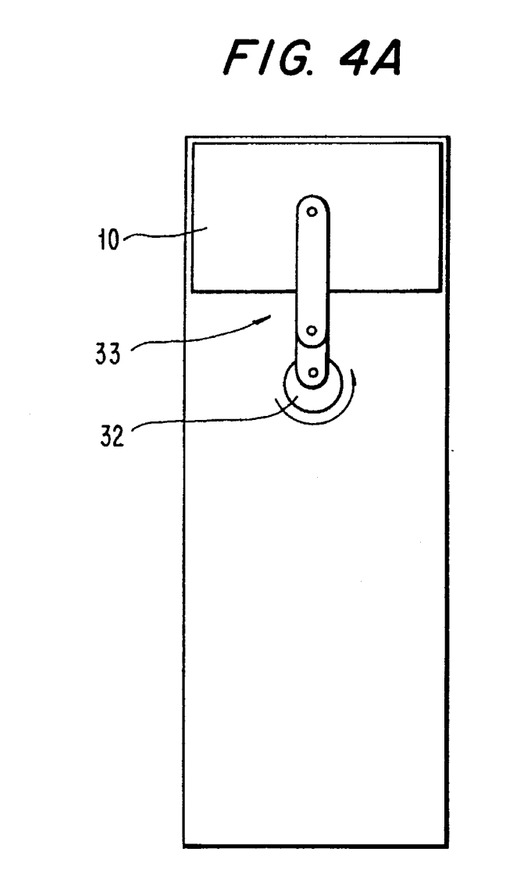
FIGS. 4A, 4B and 4C are views illustrating the operation of one embodiment according to the invention whose door closes the outlet wholly or in part and opens it.
Figure 4B:
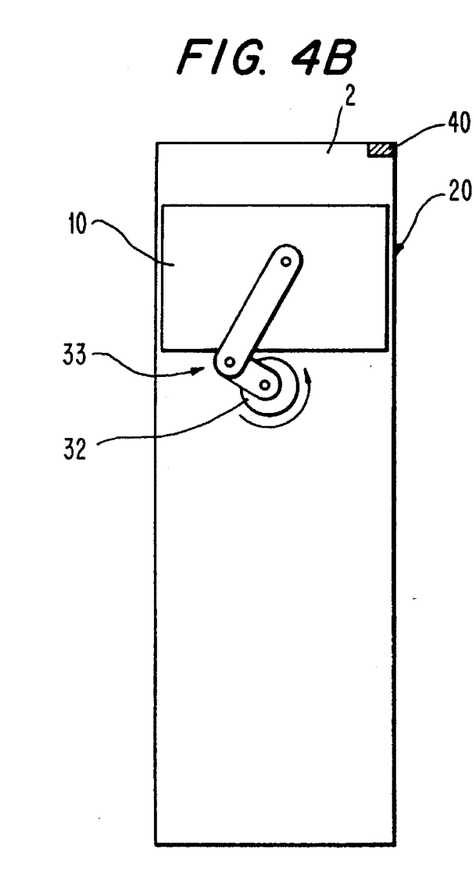
Figure 4C:
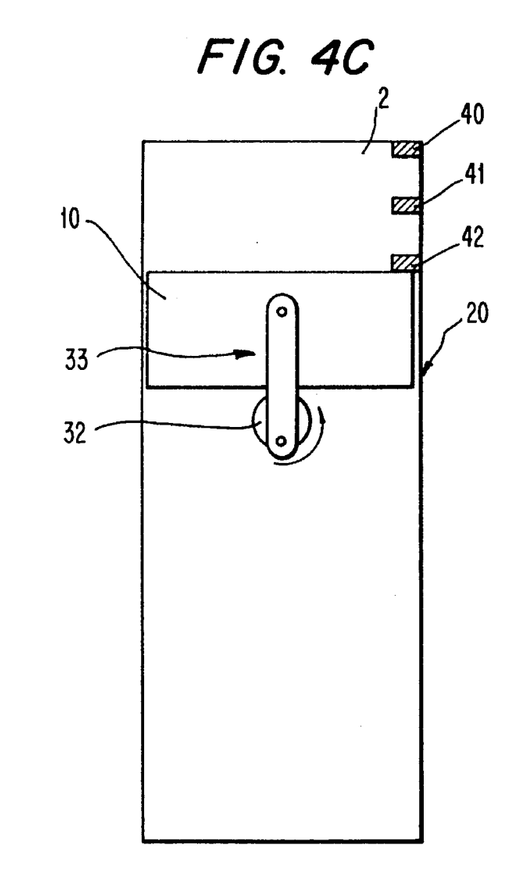

The door opening/closing apparatus 20 according to the invention is shown in FIGS. 3 and 4, wherein the cover member 3 is illustrated for the purpose of the explanation. The door opening/closing apparatus 20 comprises the door 10, a door supporting assembly 21 and a door opening/closing driving portion 30. On both sides of the door 10 are formed thin portions 13 having a predetermined width, on each surface of which two rollers 12 are mounted to be slidable in the door supporting assembly 21. The door 10 has a convex front surface for the exterior appearance and a flat rear surface.

The door supporting assembly 21 is provided with a guide member 22 forming grooves 23 on both sides so that the rollers 12 are inserted and guided therein. The guide member 22 is integrated or coupled by means of bolts or nuts with a supporting member 24 fixed to the upper portion of the body 1. The supporting member 24 supports the wind direction adjusting blades 5 and 6 to be rotated leftward and rightward or upward and downward. Disposed beneath the member 24 is a supporting plate 25 which has a hole 26 formed at the center of its upper portion to recieve the motor 32. Therefore lower portion of the door supporting assembly 21 is installed behind the cover member 3 in the body 1 as shown in FIG. 2.

The door opening/closing driving portion 30 includes the motor 32 and the power transferring portion 33 comprised of a first power transferring member 34 and a second power transferring member 35 forming a the crank configuration. The first and second power transferring members 34 and 35 are pivoted to each other at adjoining ends. The first power transferring member 34 is coupled at the other end with a connecting member 36 which is attached to the door 10 and first power transferring member 34 by means of screws 37. The second power transferring member 35 is coupled with the shaft of the motor 32.

As described above, the door supporting apparatus 20 is assembled in the body 1 in a manner that the motor 32 is mounted into the hole 26, the connecting member 36 is fixed to the rear surface of the door 10, and the guide member 22 below the supporting plate 25 is supported in a predetermined gap behind the cover member 3 by means of appropriate fixtures. Therefore, the door supporting apparatus 20 enables the door 10 having a fine appearance to close the outlet 2 during the waiting mode of the air-conditioner, so that it uniforms the overall shape of the air-conditioner and functions to harmonize with the room furniture.

Also, as the motor 32 to moves the door 10 upward and downward, a plurality of (at least two) door position sensors 40–42 such as a hole sensor and a photo sensor are mounted on one side of the outlet 2 to sense the selective movement of the door 10, as shown in FIGS. 4A, 4B and 4C. They are used in adjusting the opening state of the outlet 2.

Figure 5A:
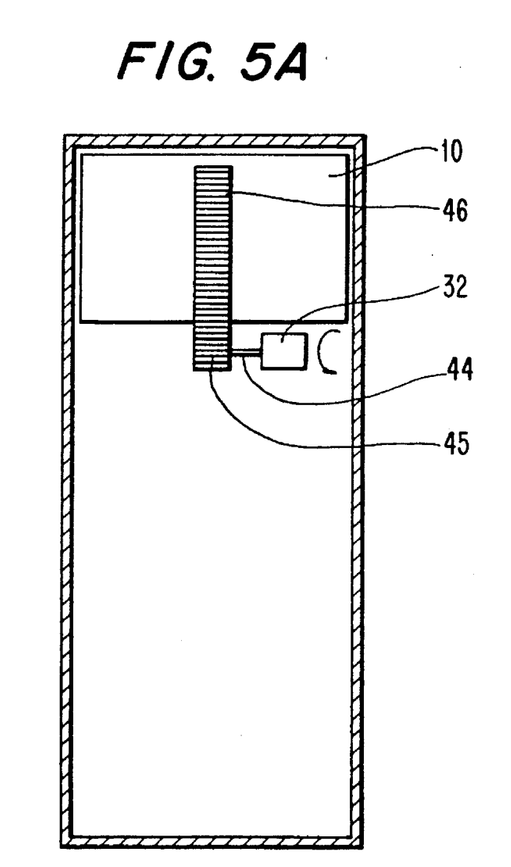
FIGS. 5A, 5B and 5C are views illustrating the operation of a second other embodiment according to the invention whose door closes the outlet wholly or in part and opens it.
Figure 5B:
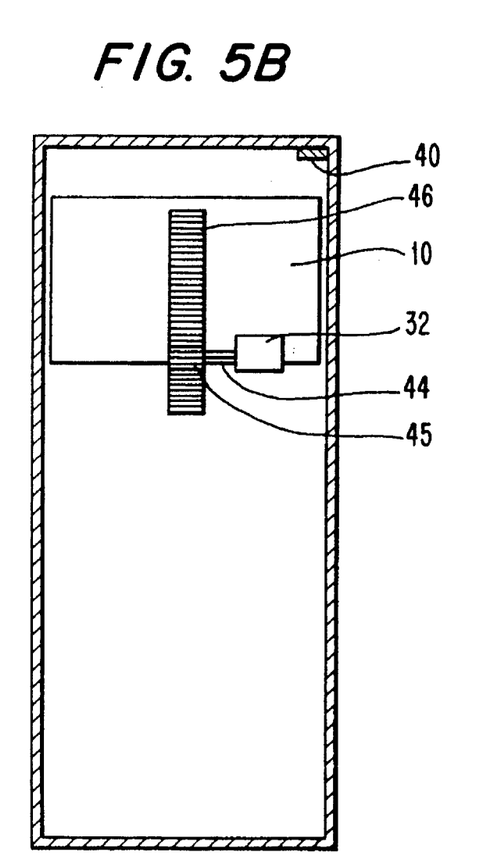
Figure 5C:
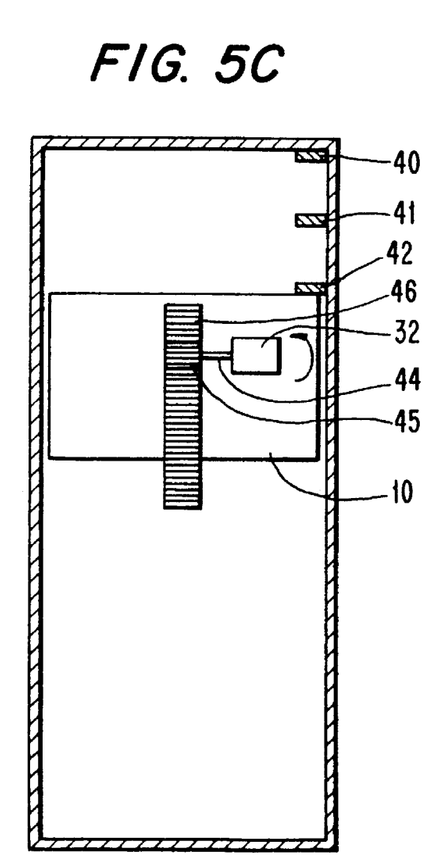

On the other hand, the door supporting apparatus 20 according to the invention may comprises another embodiment as shown in FIGS. 5A, 5B and 5C. Herein, the same numbers are referenced to the same elements as those of first embodiment. The door supporting apparatus 20 is not described in detail in the drawings, but it has the same configuration as that of the first embodiment except for the door opening/closing driving portion 30. In other words, a pinion 44 is connected to the motor 32, and a rack 46 is attached to the rear surface of the door 10. As the motor 10 is driven, the rack 46, geared with the pinion 45, is moved upward and downward to adjust the opening/closing state of the door 10.

Figure 7:
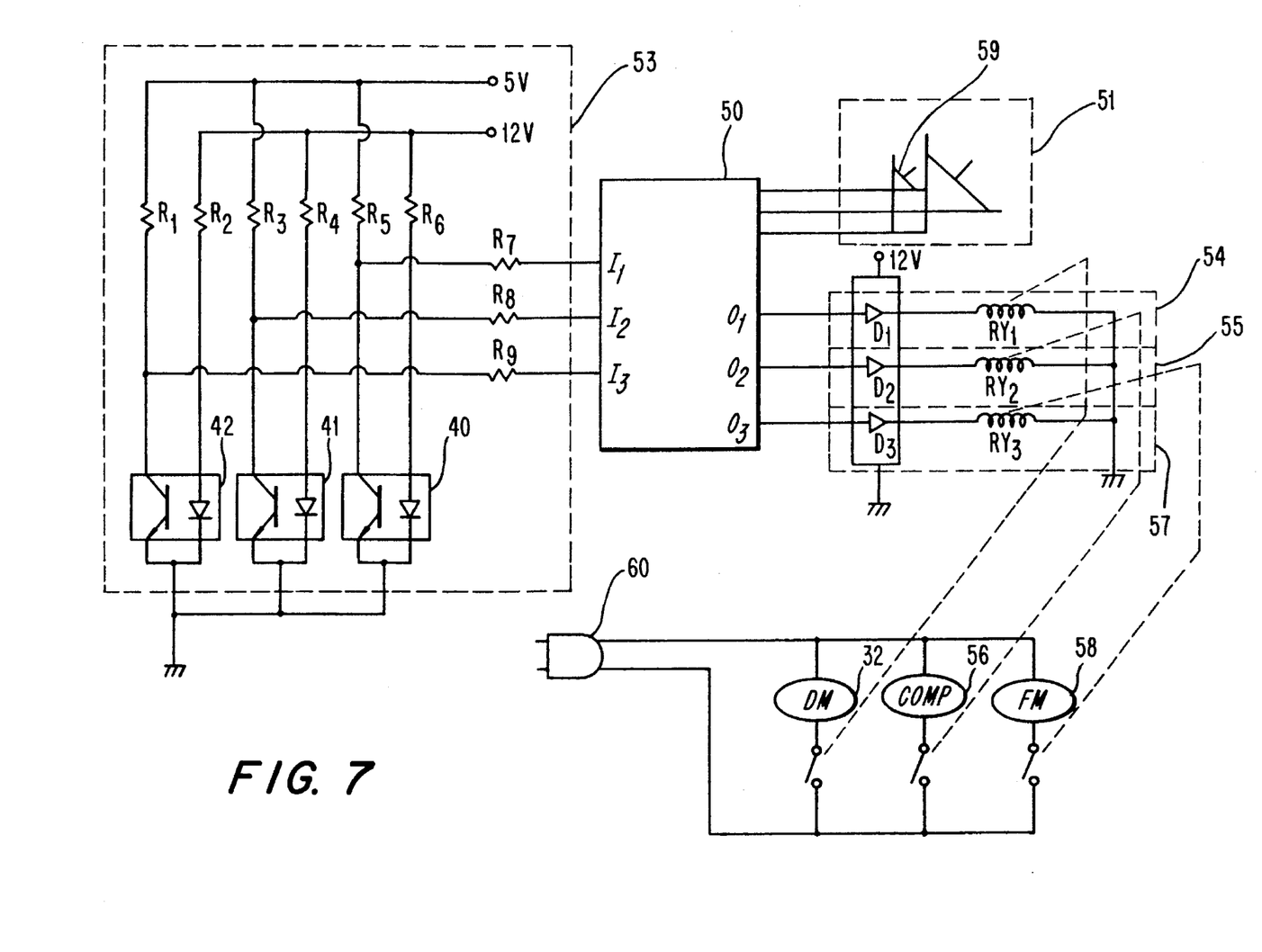
FIG. 7 is a detailed circuit controlling an automatic opening/closing apparatus according to the invention.
Figure 8A:
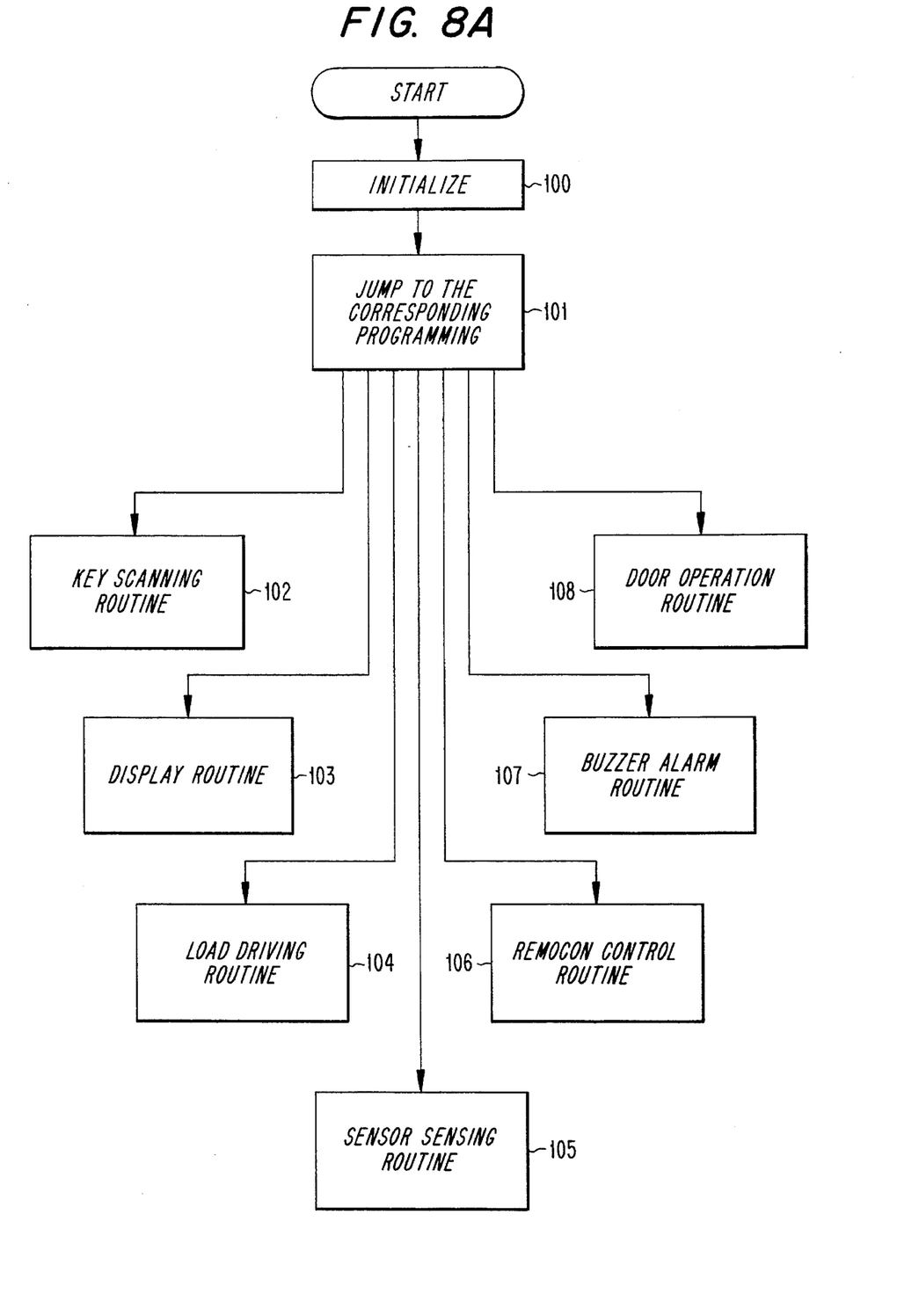
FIG. 8A is a flow chart illustrating the system control of the air-conditioner.

The door movement for opening/closing the outlet 2 is monitored by the driving control of the motor 10. A circuit and method for controlling a system of an air-conditioner associating with the motor 32 are illustrated in FIG. 6 to FIG. 8.

Figure 6:
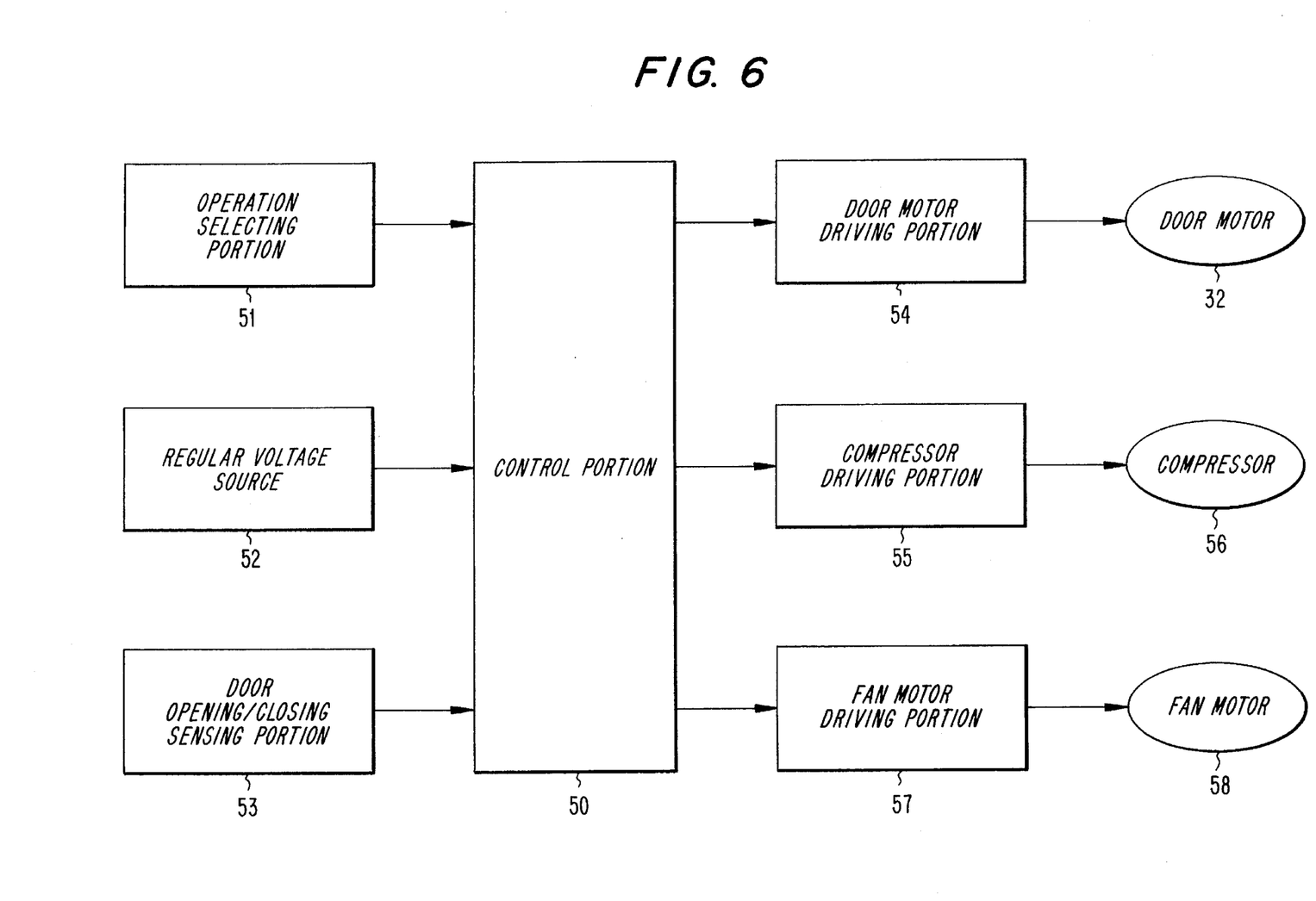
FIG. 6 is a block diagram illustrating a circuit for controlling an automatic opening/closing apparatus according to the invention.

FIG. 6 is a block diagram illustrating a system control circuit. An operation control portion 50 comprises a microprocessor which stores a system software to control the operation of an air-conditioner.

An operation selecting portion 51 is an inputting portion having a plurality of function keys (for example, an artificial intelligence, a cooling operation, a cleaning operation, a reserved operation, a stopping operation, etc.) to select the operation of the air-conditioner.

A regular voltage source 52 converts a commercial AC voltage from an inputting terminal 60 (see FIG. 7) into at least one predetermined DC voltage required for the system operation.

A door opening/closing sensing portion 53 comprises the plurality of sensors 40, 41 and 42 for sensing the opening/closing state of the door 10.

A door motor driving portion 54 drives the motor 32 according to a signal from the control portion 50. Similarly, a compressor driving portion 55 and a fan motor driving portion 57 operates a compressor 56 and a fan motor 56, respectively, according to a signal from the control portion 50.

A door opening/closing sensing portion 53 is illustrated in detail in FIG. 7, associating with the operation control of the door motor 32. The door opening/closing sensing portion 53 includes the three photo-couplers 40, 41 and 42. The light emitting diodes of the photo-couplers 40, 41 and 42 are connected through respective resistors $R_2$, $R_4$ and $R_6$ to a twelve volt voltage terminal. The photo-transistor's collectors of the photo-couplers 40, 41 and 42 are connected through respective resistors $R_1$, $R_3$ and $R_5$ to a five volt voltage terminal of the regular voltage source 52 and are also connected through each of resistors $R_7$, $R_8$ and $R_9$ to respective of ports $I_1$, $I_2$ and $I_3$ of the control portion 50. Thus, If the photo-coupler 40 is turned on, it means that the door 10 completely closes the outlet 2. The turning on of the photo-coupler 41 means a half-opening of the outlet 2 by the door 10, and the turning on of the photo-coupler 42 represents the complete closing of the outlet 2 by the door 10. More three photo-couplers can be used to create additional positions of the door.

Herein, it is noted that the light emitting diodes are arranged against the photo-transistors, respectively in the drawing, but the drawing is symbolical. One light emitting diode is fixed on the door 10 and cooperates with all of the photo-couplers during the movement.

The door motor driving portion 54, the compressor driving portion 55 and the fan motor driving portion 57 include a serial coupled diode $D_1$ and relay $RY_1$, serial coupled diode $D_2$ and relay $RY_2$, and serial coupled diode $D_3$ and relay $RY_3$. Also, the door motor 32, the compressor 56 and the fan motor 58 are connected in parallel to the commercial voltage inputting terminal 60, and are respectively connected to the switches of relays $RY_1$, $RY_2$ and $RY_3$ respectively The control portion 50 controls the movement of the door 10 for opening/closing the outlet 2 as shown in FIGS. 8A, 8B, 8C, 8D, 8E, and 8F.

Firstly, the control portion 50 initiates operation of the air-conditioner system at step 100. Thereafter, as the function key is selected in the operation selecting portion 51 at step 101, the process is controlled to perform the corresponding programming. For example, step 102 is a key scanning routine, step 103 is a display routine, step 104 is a load driving routine, step 105 is a sensor sensing routine, step 106 is a remocon control routine, step 107 is a buzzer alarming routine and step 108 is a door operation routine. On the other hand, as the invention is related to the door operation routine, other routines are considered as the general operation of an air-conditioner, the detailed explanation of which will be omitted.

The door operation routine 108 are illustrated in FIGS. 8B, 8C, 8D, 8E and 8F. At step 201 it is checked whether the door operation bit is set at "1". If the door operation bit "1" is set, the door operation is started followed by the initial operation mode.

Figure 8B:
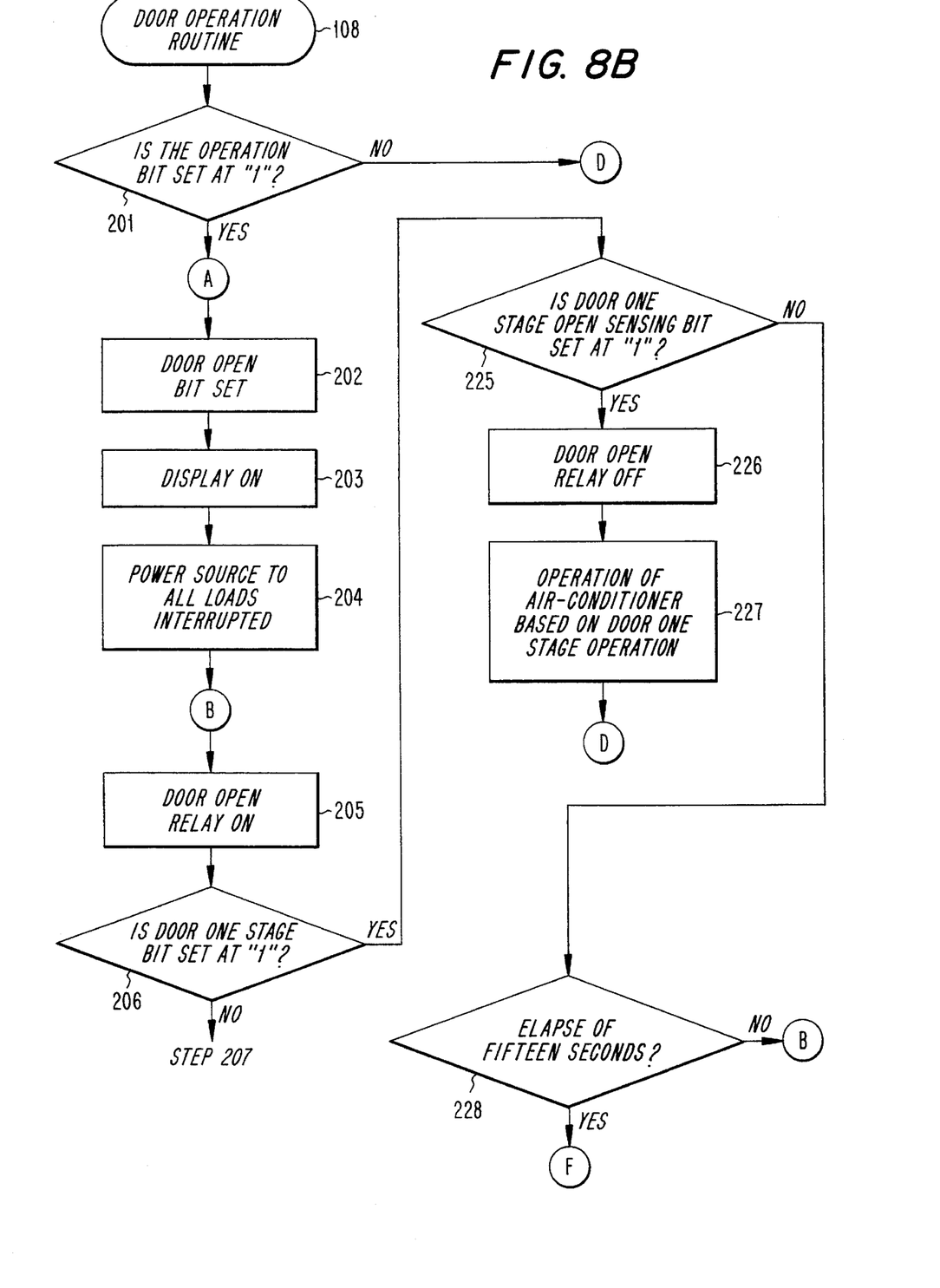
FIGS. 8B, 8C, 8D, 8E and 8F are flow charts illustrating a method of controlling the operation of the automatic opening/closing apparatus according to the principle of the invention.

In the initial operation mode, steps 202, 203 and 204 are performed in turn to set the door open bit, turn on a display and interrupt the power source to all system loads, thereby holding off the operation of loads.

Next, a door operation mode B is performed. The opening movement of the door 10 is performed at step 205 by turning on the relay $RY_1$ and driving the door motor 32 to open the outlet 2. During the movement of the door 10, step 206 is performed to judge whether a door one stage operation bit is set at "1". If the door one stage bit is not set at "1", operation proceeds step 207 (Referring to FIG. 8C) to judge whether a door open sensing bit is set according to the input signal from the photo-coupler 41. A "yes" answer means that the door is operated in one stage state to open the outlet 2 by a half portion. If the answer is "no", i.e. the door 10 is not moved, a fifteen seconds elapse is performed at step 208 by checking the counting of an internal timer. During the time period of fifteen seconds, step 207 is returned to step 208. After the elapse of fifteen seconds the operation error warning mode F is performed.

Figure 8C:
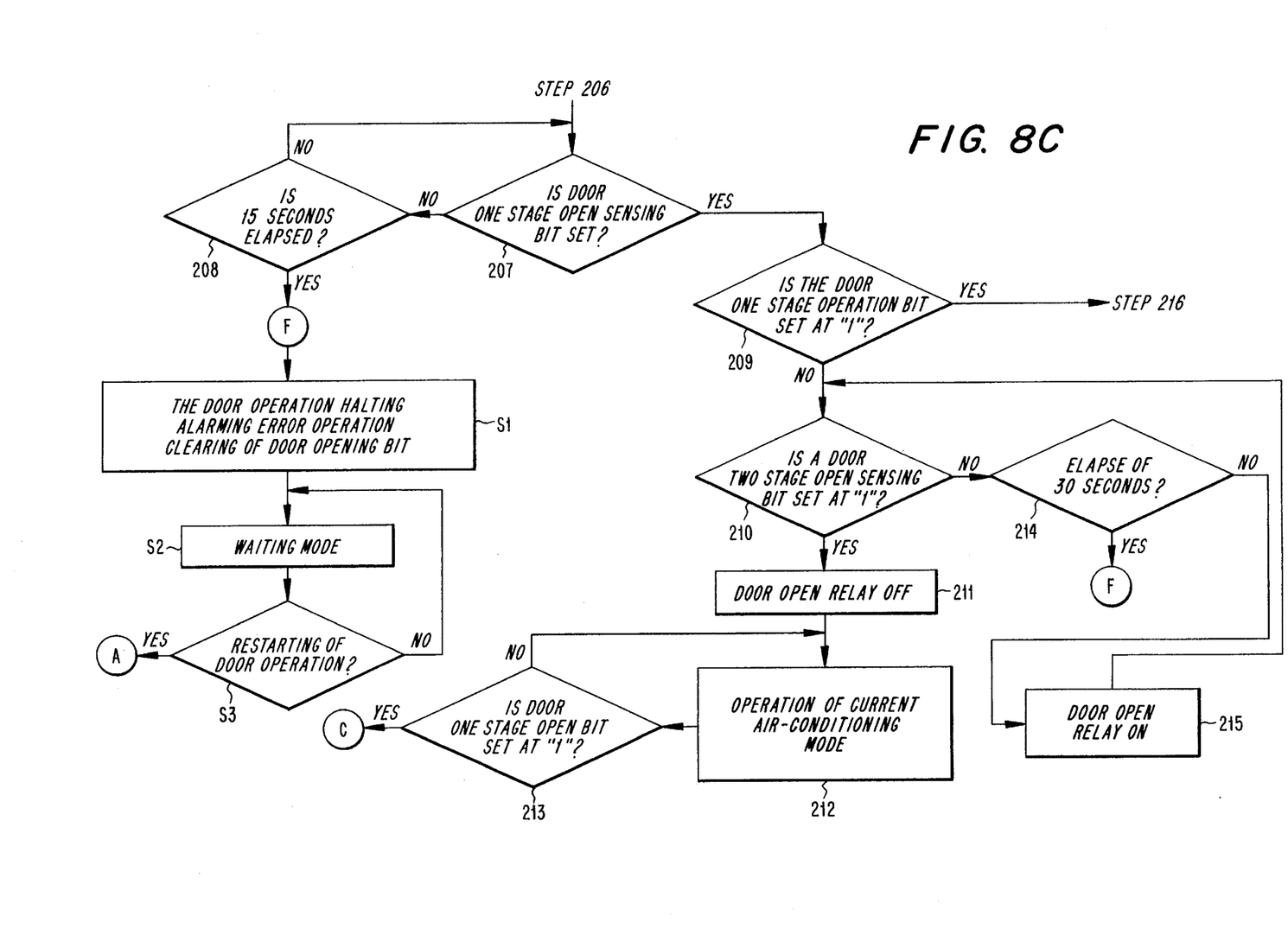
Figure 8D:
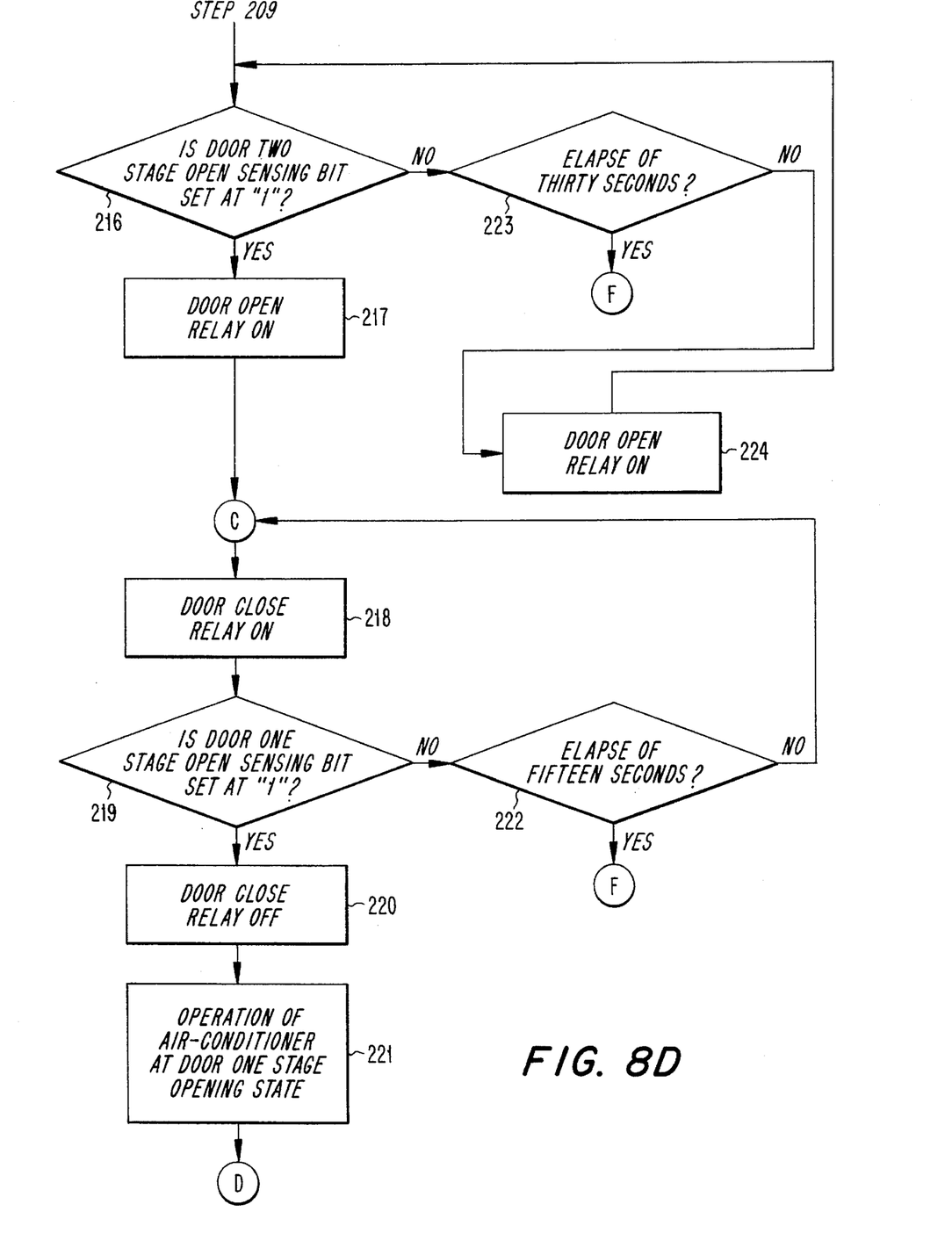
Figure 8E:
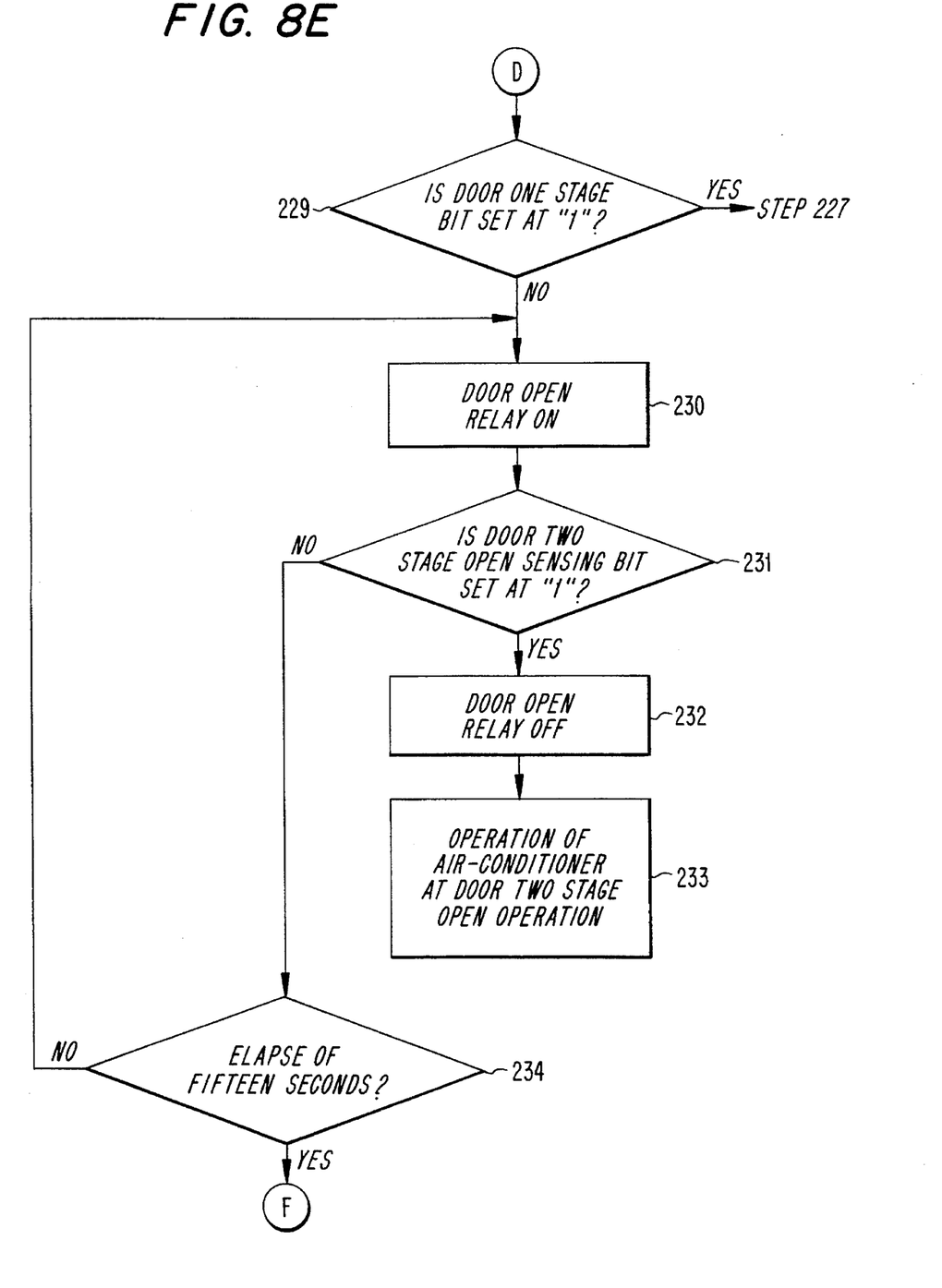
Figure 8F:
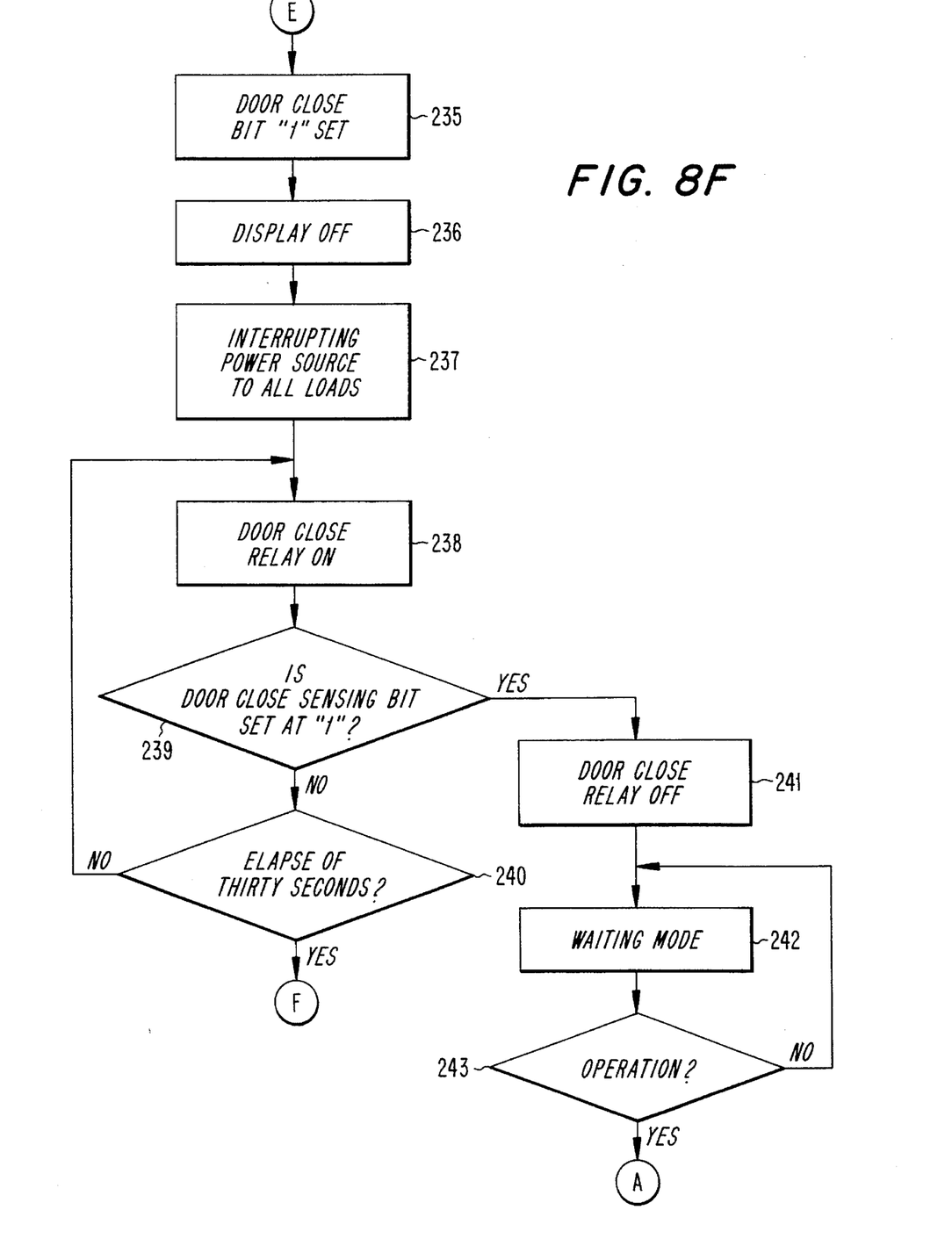

The operation error warning mode F comprises (i) step S1 for stopping the door operation, triggering an alarm to announce the operation error and clearing the door operation bit, (ii) step S2 for the waiting mode, and (iii) step S3 for judging whether the door operation key signal from the operation selecting portion 51 is inputted. If the door operation is started again, it is returned to the initial operation mode A.

On the other hand, if it is assumed at step 207 that the door one stage operation is sensed by the photo-coupler 41, operations jumps from step 207 to step 209 to judge whether the door operation bit is set at "1", again. At that time, if the door one stage operation is not set, the control proceeds to step 210 to judge whether a door two stage open sensing bit is set at "1" according to the inputting signal from the photo-coupler 42. If the door 10 opens the outlet 2, completely, the relay $RY_1$ is turned off to stop the door motor 32 at step 211. Therefore, the door 10 is maintained at the two stage opening state at step 212 to enable the air conditioner to perform the air-conditioning operation according to the system programming. If the wind velocity varying key 59 is pressed by users during the door two stage operation, operation goes from step 212 to step 213 to judge whether the door one stage open bit is set at "1". If the door one stage open bit is set at "1", operating jumps from step 213 to step 218 to perform the door one stage operation C.

On the other hand, if the door two stage open sensing bit is not set at "1" at step 210, step 214 is processed by counting the internal timer to determine whether the time of thirty seconds has elapsed to allow the door 10 to completely open the outlet 2. If the elapse of thirty seconds has not elapsed, the relay $RY_1$ is turned on at step 215 to drive the door motor 32, and step 210 is again performed. The elapse of thirty seconds indicates that the door operation is not possible or become error, so the operation error warning mode F is performed. The above explanation concerns the door two stage operation which means the normal first operation of the air-conditioner.

But, as shown in FIG. 8C, if the door one stage operation bit is set at "1" at step 209, the control jumps to step 216 to judge whether the door two stage open sensing bit is set at "1" according to the input signal from the photo-coupler 42. If the input signal is received, operation jumps from step 216 to step 223 to determine whether the time of thirty seconds has elapsed by counting the internal timer. If the elapse of thirty seconds has occurred, it is judged that the door operation is error, so the operation error warning mode F is performed. If the time of thirty seconds has not elapsed, the relay $RY_1$ is turned on at step 224 to drive the door motor 32, and then step 216 is again performed.

On the other hand, if the door two stage open sensing bit is set at "1" at step 216, step 217 is performed to turn off the relay $RY_1$, thereby stopping the operation of the door motor 32, and then the door one stage operation mode C is performed.

The door one stage operation C begins from step 218 to turn on the relay $RY_1$, thereby enabling the door 10 to partially close the outlet 2. During the closing operation of the door 10, step 219 is performed to judge whether a door one stage open sensing bit is set at "1" according to the inputting signal from the photo-coupler 41. If the input signal from the photo-coupler 41 is presented, the relay $RY_1$ is turned off to stop the door motor 32 at step ,220. Therefore, the door 10 is maintained at the one stage opening state at step 221 to enable the air conditioner to perform the air-conditioning operation according to the system programming. During the performance of the door one stage operation mode C, the door operation detecting mode D is performed as will be described below.

On the contrary, if is judged at step 219 that the door one stage open sensing bit is not set at "1", the judgement of fifteen second elapse is performed at step 219 by checking the counting of an internal timer. During the time period of fifteen seconds, step 222 is returned to step 218. After the elapse of fifteen seconds, the operation error warning mode F is performed.

Referring to FIG. 2B, again, if the door one stage operation bit is set at "1", operating jumps from step 206 to step 225 to judge whether the door open sensing bit is set at "1". At that time, if it is judge that the wind velocity varying key 59 is pressed and the movement of the door 10 is completed, the relay $RY_1$ is turned off to stop the door motor 32 at step 226. Therefore, the door 10 is maintained at the one stage opening state at step 227 to enable the air conditioner to perform the air-conditioning operation. Simultaneously, the door operation detecting mode D is performed.

On the contrary, if the door open sensing bit is not set at "1", operating jumps from step 225 to step 228 to judge whether the time of fifteen seconds has elapsed. The judgement of a fifteen seconds elapse triggers the performance of the operation error warning mode F. During the time period of fifteen seconds, the door operation mode B is performed.

The door operation detecting mode D is performed to judge whether the operation of the door 10 is continued with the outlet 2 being opened at a predetermined size or at two stage operation state. In other words, as shown in FIG. 8E, it is judged at step 229 whether the door one stage operation bit is set at "1". If the bit is set at "1", step 227 for keeping the one stage operation of the door 2 is performed. Otherwise, if the bit is not set at "1", it is judged at step 230 that the door two stage operation must be performed, the relay $RY_1$ is turned on to drive the door motor 32 at step 232, thereby enabling the door 10 to open the outlet 2, completely. Therefore, the door 10 is maintained at the two stage opening state at step 233 to enable the air conditioner to perform the air-conditioning operation according to the system programming.

On the contrary, if it is judged at step 230 that the door two stage open sensing bit is not set at "1", the judgement of fifteen second elapse is performed at step 234 by checking the counting of an internal timer. During the time period of fifteen seconds, step 234 is returned to step 230. After the elapse of fifteen seconds, the operation error warning mode F is performed.

On the other hand, during the checking of the door operation routine at step 201, if the door operation bit is set at "1", a door operation interrupting mode E is performed as shown in FIG. 8F. At that time, operating jumps from step 201 to step 235 to set the door close bit at "1". Then, steps 236, 237 and 238 are sequentially performed (i) to turn off the display, (ii) interrupt the power source to all system loads, thereby holding off the operation of loads, and (iii) turn on the relay $RY_1$ to close the outlet.

Next, operation proceeds from step 238 to step 239 to judge whether a door close sensing bit is set at "1" according to the input signal from the photo-coupler 41. That means that the door is operated in one stage state to open the outlet 2 by a half portion. If the door 10 does not close the outlet 2, the judgement of a thirty seconds elapse is performed at step 240 by checking the counting of an internal timer. During the time period of thirty seconds, step 240 is returned to step 238. After the elapse of thirty seconds the operation error warning mode F is performed.

If the door close sensing bit is set at "1", operation jumps from step 239 to step 241 to turn off the relay $RY_1$ for driving the door 10. Then, at step 242 the system is in the operation waiting mode. During the operation waiting, mode step 243 is performed to judge whether the door operation is required according of the operation key input. If the operation key input is scanned, the door initial operation mode A is performed.

As described above, the invention controls the door operation to vary the wind velocity in multiple stages and closes an outlet during the operation waiting mode of an air-conditioner, so that the efficiency of the air-conditioning can be improved, and a fine appearance can be accompanied, while the introduction of dusts or alien materials can be prevented.

What is claimed is:

1. An air conditioner comprising:

a body having an inlet and an outlet;

a fan for circulating air from the inlet to the outlet;

a heat exchanger for exchanging heat with air being circulated;

a compressor connected to the heat exchanger for compressing refrigerant fed to the heat exchanger;

a door for opening and closing the outlet;

a door motor connected to the door for moving the door;

a door sensing mechanism for sensing the position of the door;

movable vanes disposed at the outlet for adjusting the direction of an air flow exiting the outlet; and an automatic control system, comprising:

an operation selection mechanism actuable by a user for actuating the air conditioner, an operation control mechanism connected to the operation selection mechanism and the door sensing mechanism for controlling the door motor, a support member disposed at the outlet on which the door motor and the movable vanes are supported, the support member including guides for guiding the door as it moves.

2. The air conditioner according to claim 1, wherein the door is positionable in a partially open position and a fully open position for varying the velocity of discharged air.

3. The air conditioner according to claim 1, wherein the door sensing mechanism includes a photo-couplers disposed along a path of travel of the door.

4. The air conditioner according to claim 1, wherein the door sensing mechanism includes a hole in the door.

5. A method for automatically controlling the operation of an outlet opening of an air conditioner having a fan for circulating air, comprising the steps of:

A) selecting a desired air velocity on a control panel of the air conditioner;

B) causing a door motor to move a door for opening the outlet;

C) monitoring the movement of the door; and

D) deactivating the door motor in response to one of:

D1) the door reaching a position which opens the outlet by an amount producing the selected velocity, and D2) the door failing to reach such position in a predetermined time period.

6. The method according to claim 5, wherein step D1 comprises deactivating the door motor in response to the door reaching one of: a partially open position and a fully open position.

* * * * *